United States Patent [19]

Lace

[11] E Patent Number: Re. 32,520

[45] Reissued Date of Patent: Oct. 13, 1987

[54] MAGNETIC PROBE

[76] Inventor: Melvin A. Lace, 3 Garden Ct., Prospect Heights, Ill. 60070

[21] Appl. No.: 448,042

[22] Filed: Dec. 8, 1982

Related U.S. Patent Documents

Reissue of:

[64] Patent No.: 4,268,771
Issued: May 19, 1981
Appl. No.: 965,939
Filed: Dec. 4, 1978

U.S. Applications:

[63] Continuation-in-part of Ser. No. 849,547, Nov. 4, 1977, abandoned.

[51] Int. Cl.[4] ..... H02K 21/38

[52] U.S. Cl. ..... 310/155; 310/168

[58] Field of Search ..... 310/155, 168

[56] References Cited

U.S. PATENT DOCUMENTS 3,492,518 1/1970 Wayne ..... 310/155
3,942,045 3/1976 Palazzetti ..... 310/155
4,002,937 1/1977 Anson ..... 310/168

*Primary Examiner*—Donovan F. Duggan
*Attorney, Agent, or Firm*—Kinzer, Plyer, Dorn, McEachran & Jambor

[57] ABSTRACT

A magnetic probe for sensing the passage of a moving magnetic element, comprising a radially magnetized cylindrical permanent magnet, formed of a flat sheet of elastomer bonded ferrite material magnetized across its smallest dimension and curled to cylindrical configuration, or formed in cup-shaped configuration. A magnetic collector core is mounted co-axially in one end of the magnet cylinder and has an axial pole piece of reduced diameter projecting to the other end of the magnet cylinder, and an electrical sensor coil encompasses the pole piece; the sub-assembly comprising the magnet, the core, and the coil is mounted in a cylindrical magnetic housing, with only high-reluctance flux paths between the inner surface of the permanent magnet and the housing.

15 Claims, 8 Drawing Figures

MAGNETIC PROBE

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of application Ser. No. 849,547, filed Nov. 4, 1977 now abandoned.

BACKGROUND OF THE INVENTION

A magnetic probe, sometimes called a magnetic pickup or magnetic sensor, is a non-contact transducer employed to convert the kinetic energy of a ferromagnetic element moving past the probe into electrical energy. These devices are used in a variety of applications, frequently being employed to sense the movement of gear teeth or similar elements for synchronization and timing purposes. A common construction for a magnetic probe of this general type comprises a permanent magnet of disc or rod shape having a pole piece of reduced diameter projecting coaxially from the disc and an electrical sensing coil mounted on the pole piece. The magnet, pole piece, and coil are usually mounted in a cylindrical housing, though the housing is sometimes omitted.

Magnetic probes are highly advantageous in many applications, as compared with mechanical or optical sensors. There are no switch contacts to wear out, no cables to break, no mechanical couplings subject to failure, no lamps to fail, and no necessity for protection from dirty environments. Magnetic probes are also highly reliable and afford extremely long operating life with little or no maintenance cost.

A magnetic probe of conventional construction, as generally described above and as illustrated in FIG. 1, however, does present some substantial technical problems and difficulties. Thus, some form of non-magnetic housing is a virtual necessity for the probe, because a magnetic housing or other magnetic member in close proximity to the permanent magnet may effectively short-circuit the magnetic sensing field of the device and prevent effective operation. Indeed, magnetic losses in conventional probes are quite high, and it is often difficult to obtain an output signal of adequate amplitude. The mounting of the probe is often critical, particularly if the probe is used in a magnetic environment as in a timing device for an internal combustion engine. For applications of that kind, the probe housing must usually be constructed of stainless steel or other non-magnetic steel, materially increasing the cost of the probe. Furthermore, if located within a substantial magnetic field the conventional probe may be de-magnetized and thus rendered inoperative.

A form of magnetic transducer, which could be used as a probe, is shown in Palazzetti U.S. Pat. No. 3,942,045. One form of the Palazzetti transducer employs a cylindrical permanent magnet, uniformly magnetized in a radial direction, in a magnetic circuit structure that permits the use of a housing formed of steel or other magnetic material, thus avoiding one of the principal problems of the conventional probe discussed above. But this form of the device incorporates magnetic structures of undesirable complexity and cost, and does not provide strong enough output signals when reduced to the size required for some critical applications.

SUMMARY OF THE INVENTION

It is a principal object of the invention, therefore, to provide a new and improved magnetic probe construction that effectively and inherently minimizes or eliminates the problems and difficulties of previously known probes and like transducers as discussed above.

A specific object of the invention is to provide a new and improved magnetic probe that affords a high amplitude signal output without requiring critical adjustment of the probe with respect to the gear teeth or other elements that it senses, employing small, simple components that do not require undue cost or precision in the assembly of the probe.

Another object of the invention is to provide a new and improved magnetic probe construction that exhibits minimal magnetic losses, that is virtually immune to de-magnetization, and that can be quickly assembled from components of simple configuration formed of inexpensive materials by routine manufacturing processes.

A further object of the invention is to provide a new and improved magnetic probe construction that permits the use of a permanent magnet formed from a sheet of flexible elastomer material simply inserted into a tubular housing of ordinary steel, affording a rugged construction at very low cost.

Accordingly, the invention relates to a magnetic probe for sensing the passage of a moving magnetic element. The probe comprises a cylindrical housing of high permeability material, a radially magnetized cylindrical permanent magnet mounted coaxially within the housing and extending inwardly from one end of the housing in circumferential surface-to-surface contact with the housing, a core of high permeability material mounted within and extending axially of the permanent magnet, the core including a small diameter pole piece extending axially inwardly from the one end of the housing and joined to a large diameter magnetic flux collector engaging the interior of the permanent magnet in circumferential surface-to-surface contact at a location spaced from the one end of the housing, and an electrical sensor coil encompassing the pole piece; only high-reluctance flux paths are present between the interior surface of the permanent magnet and the housing.

DESCRIPTION OF THE PREFERRED EMBODIMENTS

Figures 1, 2, 3, 4, 5A, 5B, 6, 7:
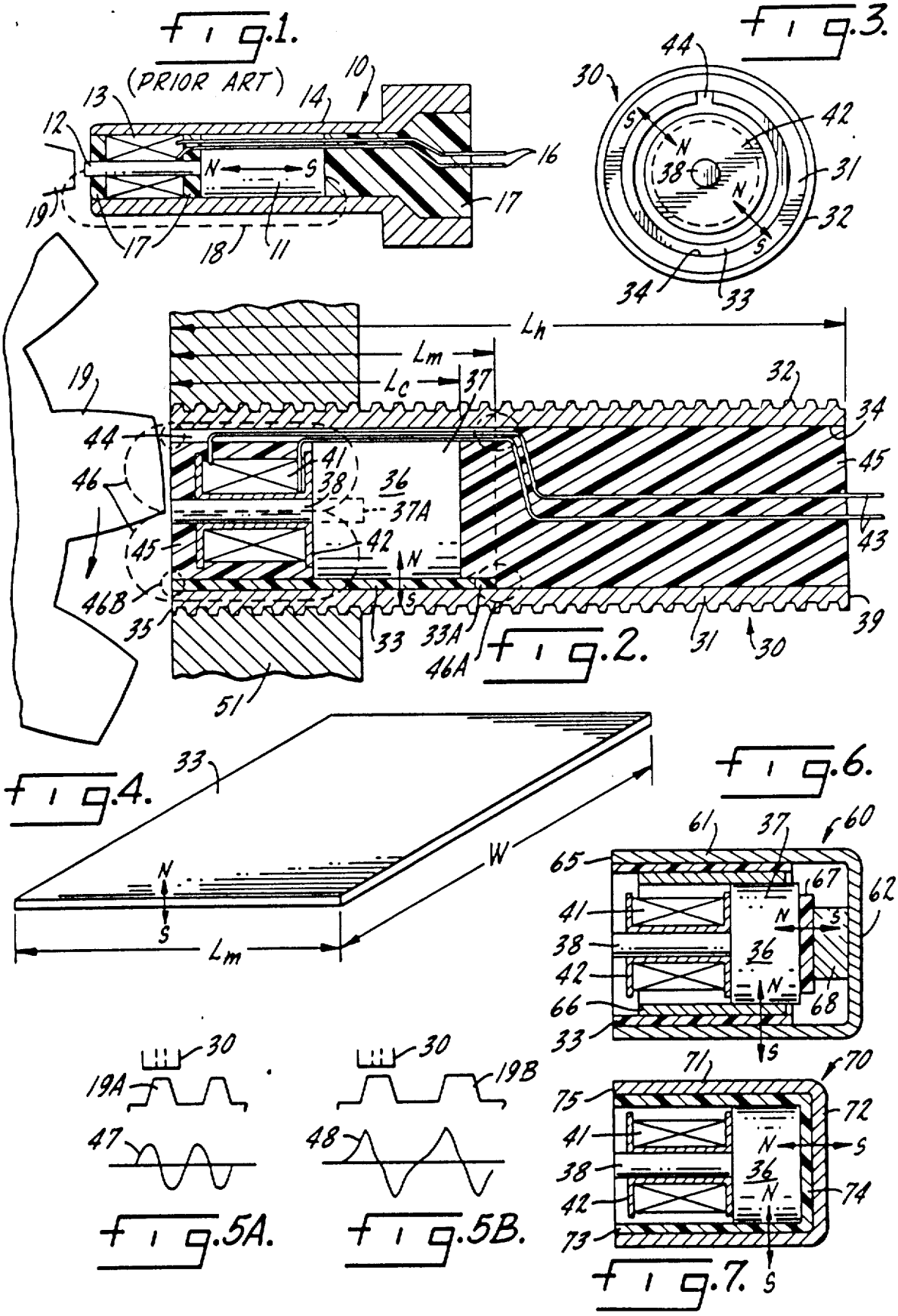
fig.1. (PRIOR ART)
FIG. 1 is a sectional elevation view of a magnetic probe of the kind most commonly used in the prior art.
FIG. 2 is a sectional elevation view of a magnetic probe constructed in accordance with one embodiment of the present invention.
FIG. 3 is an end view of the probe of FIG. 2, taken from the sensing end of the probe, before sealing of the probe.
FIG. 4 is a perspective view of a preferred form of permanent magnet used in the probe of FIGS. 2 and 3, prior to assembly with other components of the probe.
FIGS. 5A and 5B illustrate the output waveforms for the probe of FIGS. 2 and 3 for common operating conditions.
FIGS. 6 and 7 are sectional elevation views of magnetic probes constructed in accordance with two further embodiments of the invention.

FIG. 1 illustrates a prior art magnetic probe constuction that is used in a wide variety of applications, including synchronizing devices for internal combustion engines, timing and synchronizing equipment for teleprinters, and many others. The probe 10 shown in FIG. 1 includes a permanent magnet 11 in the form of a thick disc or rod, longitudinally magnetized as indicated in the drawing. A pole piece 12, substantially smaller in diameter than magnet 11, projects coaxially from one end of the magnet. An electrical sensing coil 13 is mounted in encompassing relation to pole piece 12. Magnet 11, pole piece 12, and coil 13 are mounted within a housing or shell 14 which is formed from non-magnetic material to preclude shorting out the magnetic sensing field, which must extend through pole piece 12. Electrical connector leads 16 for coil 13 are brought out to the end of housing 14 opposite pole piece 12. The interior of shell 14 is filled with potting resin 17 to afford a totally sealed probe structure. For effective operation it is usually necessary that the tip of pole piece 12 project slightly beyond the end of shell 14.

The configuration of the magnetic field for probe 10 is generally indicated by dash line 18. When a magnetic element such as a gear tooth 19 approaches the tip of pole piece 12 it disturbs the magnetic field 18 and induces a voltage in coil 13. An output signal from coil 13 is produced each time a gear tooth or other ferromagnetic discontinuity passes the outer end of pole piece 12. The amplitude of the signal from the probe is roughly proportional to the speed of tooth passage and is inversely proportional to the spacing between element 19 and pole piece 12.

The large air gap in the magnetic circuit for probe 10, as generally indicated by field line 18, inherently results in relatively large magnetic losses. Furthermore, it is essential that the gear tooth or other element 19 being sensed approach quite closely to pole piece 12 in order to develop a usable output signal from coil 13. If probe 10 is mounted in a rugged environment it is usually necessary to fabricate housing 14 from stainless steel or other relatively expensive non-magnetic steel. Furthermore, magnet 11 may be subject to de-magnetization if the probe is located in a relatively strong alternating magnetic field as may be encountered in an internal combustion engine or other environments.

FIGS. 2 and 3 illustrate a magnetic probe 30 constructed in accordance with one preferred embodiment of the present invention; probe 30 inherently and effectively overcomes the difficulties and problems associated with conventional probes such as the probe 10 of FIG. 1. Probe 30 comprises a cylindrical housing 31 of high permeability material having a threaded exterior surface 32. Preferably, housing 31 is formed of ordinary, inexpensive magnetic steel and may constitute a length of ordinary steel tubing. The thread 32 is utilized only for mounting purposes and has no effect on the operating characteristics of the probe; housing 31, as shown, can be fabricated at minimum expense, as by means of a screw machine, particularly because the interior of the housing is of uniform diameter throughout its length. Typically, the outside diameter of housing 31 may be of the order of 0.625 inch, though substantial variation is permissible.

A radially magnetized cylindrical permanent magnet 33 is mounted coaxially within the axial bore or chamber 34 in housing 31. One end of magnet 33 is aligned with one end 35 of housing 31; the magnet extends inwardly from end 35 of housing 31 in circumferential surface-to-surface contact with the inner surface of bore 34 throughout the length $L_m$ of the magnet.

A core 36 of high permeability material, preferably ordinary steel, is mounted coaxially within the cylindrical permanent magnet 33. Core 36 includes a magnetic flux collector portion 37 having an outer diameter approximately equal to the inner diameter of magnet 33, so that the exterior of the collector engages the interior of the magnet in surface-to-surface contact throughout the collector length. A reduced-diameter pole piece 38 is a part of core 36; pole piece 38 projects from collector portion 37 of the core out to the end 35 of housing 31. The collector and pole piece portions of core 36 may be formed from a single, unitary piece of steel. Alternatively, pole piece 38 can be mounted in collector 36 by a threaded connection 37A, usually a more economical construction.

An electrical sensor coil 41, preferably wound on a conventional bobbin 42, is mounted in encompassing relation to pole piece 38. As shown in FIG. 2, the coil and bobbin preferably have an axial length slightly less than the length of pole piece 38 so that the coil terminates short of the outer end 35 of the probe. The electrical leads 43 for coil 41 may be disposed in a small gap 44 in the cylindrical magnet 33 and extend out through the outer end 39 of probe housing 31. On the other hand, the coil wire is usually thin enough and magnet 33 usually has enough "give" so that leads 43 can be brought out to end 39 of the probe between the magnet and collector 37. In the preferred construction, the interior of housing 31 is filled completely with a suitable potting resin 45 to provide a completely sealed probe structure. In some instances it may be desirable to use an electrically conductive resin to ground core 36 to housing 31, or a separate grounding wire (not shown) can be used.

Because magnet 33 is uniformly radially magnetized, in the direction in FIGS. 2 and 3, the entire interior of the portion of chamber 34 encompassed by the magnet appears as a magnetic pole of one polarity, in this instance north polarity. Of course, the opposite polarity can be used. Most of the flux from magnet 33 is collected by the collector 37 of core 36. Accordingly, a strong magnetic field is established between housing 31 and pole piece 38, at the one end of probe 30, as generally indicated by dash lines 46. Some magnetic losses are experienced across the high-reluctance "air" gaps present at the opposite ends of magnet 33 as generally indicated by dash lines 46A and 46B. However, the magnetic field is much better concentrated at the operating end 35 of the probe than in the case of the prior art constructions described above. The support 51 for probe 30 can be magnetic or non-magnetic; it makes no significant difference operationally.

In broad general terms, the operation of probe 30 is essentially similar to that of previously known probes. A gear tooth or other magnetic element 19 approaching end 35 of probe 30 creates a disturbance in the magnetic field 46 which in turn develops an electrical voltage in sensor coil 41. The principal magnetic effect is a major reduction in reluctance for the portion 46 of the magnetic field between housing 31 and pole piece 38. A further disturbance is created when the magnetic element 19 leaves the area proximate to the sensor end 35 of probe 30, restoring the flux path 46 to its initial high reluctance condition. The waveform for the output signal from sensor coil 41 for a medium tooth gear 19A corresponds generally to curve 47 of FIG. 5A. For a coarse tooth gear 19B (FIG. 5B) the waveform may be as indicated by curve 48. Other variations in the output signal from coil 41 may occur with changes in the size and shape of the magnetic projections 19 being sensed. The waveforms are generally the same as for conventional probes, but the amplitudes are much greater for probes of comparable size.

Probe 30 affords substantial operational advantages as compared with probe 10. Probe 30 is virtually immune to de-magnetization because its permanent magnet 33 is enclosed in the magnetic housing 31. The magnetic circuit arrangement of probe 30 is substantially more efficient than that for previously known probes; for a probe of given size and using the same form of electrical sensor coil, probe produces an output amplitude at least several times greater than probe 10. In fact, the output signal from probe 30 is usually at least four to six times greater in amplitude than for a probe 10 of comparable construction. Extension of magnet 33 to the outer end 35 of probe 30 and beyond the opposite end of core 36 is also advantageous in assuring maximum amplitude for the probe output.

The components of probe 30 are inexpensive and assembly is extremely simple and economical. Permanent magnet 33 starts as a thin, flat sheet of magnetizable elastomer material (FIG. 4) magnetized through its thickness. The permanent magnet sheet is curled lengthwise and inserted into housing 31 into the position shown in FIG. 2. A simple jig inserted into end 39 of housing 31 can serve to assure axial alignment of the permanent magnet in the housing. The magnet width W may be made slightly smaller than the inner circumference of the chamber 34 in housing 31 so that the gap 44 for coil leasd 43 is formed automatically; the gap may be omitted, if desired. Core 36, with coil 41 mounted thereon, is then inserted into the position shown in FIG. 2 and the interior of chamber 34 is subsequently filled with a suitable potting resin. A suitable adhesive can be used to hold the coil, core, and magnet in position prior to potting. Precision assembly tolerances are not required.

In the preferred construction illustrated in FIG. 2, the length $L_m$ of permanent magnet 33 is made slightly larger than the total length $L_c$ of core 36. Consequently, a short length 33A of magnet 33 projects beyond core 36 at the end of the core opposite pole piece 38. It has been found that a short projection 33A, usually of the order of 1/16 to ⅛ inch, depending upon the overall size of the probe, adds materially to the magnetic efficiency of the device.

The magnet length $L_m$ is preferably less than the housing length $L_h$ to assure maximum protection against de-magnetization and physical damage. Magnet 33 may extend to a point flush with housing end 35, as shown, or it can be terminated a small distance short of housing end 35 and covered with resin 45 for further protection. However, magnet 33 should cover all of coil 41. Furthermore, it has been found that recessing the magnet to any substantial distance from probe end 35, so that an appreciable length of housing 31 faces the outer tip of pole piece 38 with no magnet between, can lead to an appreciable reduction in output amplitude.

The much preferred construction for permanent magnet 33 is a flat sheet curled to cylindrical form, as described in connection with FIGS. 2-4; this is by far the simplest and most economical construction, yet is simple and easy to assemble into the probe. Other structural arrangements, however, can be used for the cylindrical permanent magnet. Thus, the permanent magnet can be preformed in two semi-cylindrical elements or even as a complete cylinder if desired, usually at some sacrifice in economy.

In some instances, it may be desirable to utilize some part of the equipment in which the probe is employed as the exterior housing for the probe. A probe sub-assembly can be readily constructed, comprising magnet 33, core 36, and coil 41. In fabricating a sub-assembly of this kind, the permanent magnet, if formed from sheet material as illustrated in FIG. 4, is simply wrapped around the collector portion 37 of core 36 and secured thereto by appropriate means such as an epoxy resin. Similar means may be utilized to mount coil 41 on pole piece 38. For protection, the sub-assembly can then be molded into a suitable resin body to afford a device that can be mounted directly in a working mechanism as generally represented by the mounting wall 51. A sub-assembly of this kind would ordinarily be employed for relatively small probes, of the order of one-quarter inch or less total diameter. A sub-assembly arrangement should be used in an environment in which some external element, such as support wall 51, is of magnetic material, thus affording a direct substitute for housing 31.

The high amplitude output of the device makes axial adjustment of the probe position, relative to the sensed magnetic element 19, less critical than for prior art probes. Furthermore, and as shown in FIG. 2, pole piece 38 need not project beyond the end 35 of the remainder of the probe structure. Thus, both initial assembly and subsequent mounting of the probe are less critical for probe 30 as compared with the prior art.

FIG. 6 illustrates a magnetic probe 60 constructed in accordance with another embodiment of the present invention. Probe 60 comprises a cup-shaped magnetic housing 61 having a closed base 62 and an open end 65. Housing 61 need not be of one-piece construction as shown; base 62 can be a simple cap threaded onto or otherwise affixed to the tubular portion of the housing. A cylindrical permanent magnet 33 is mounted in housing 61 and extends inwardly of the housing from the open end 65. A cylindrical internal shell 66 of high permeability material is mounted within magnet 33 and the core 36 of the probe is mounted inside shell 66. The arrangement of pole piece 38 and coil 41, on its bobbin 42, remains the same as for the embodiment of FIG. 2.

A disc-shaped auxiliary permanent magnet 67, magnetized in an axial direction, is mounted on the end surface of the collector portion 37 of core 36 opposite pole piece 38. Magnet 67, like magnet 33, is preferably formed of elastomer-bonded ferrite, though other permanent magnet materials can be used for either. A disc-shaped auxiliary magnetic flux collector 68 of high permeability material may be used to connect the auxiliary magnet 67 to the base 62 of housing 61, or the housing dimensions may be selected to bring the housing into direct engagement with the outer face of the auxiliary magnet.

Probe 60, FIG. 6, provides the same advantages as probe 30, FIG. 2, with additional enhancement of the output amplitude. Permanent magnets 33 and 67 are both magnetized toward the interior of the device so that it is again possible to utilize magnetic material for the outer shell or housing 61. Magnetic losses are even lower than in probe 30 and precision assembly is again not required. The interior shell or shield 66 has also been found to improve the performance characteristics of a probe like that of FIG. 2 that does not include the auxiliary magnet 67. As in the case of probe 30, probe 60 requires only components of simple tubular or rod-like configuration, minimizing manufacturing costs.

FIG. 7 is a sectional elevation view, like FIGS. 2 and 6, of a magnetic probe 70 constructed in accordance with yet another embodiment of the present invention. Probe 70 includes a cup-shaped magnetic housing 71 having a closed base 72 and an open end 75. Base 72 is shown as being of integral one-piece construction with the side walls of housing 71 but could be a separate member threaded into or otherwise affixed to the cylinder portion of the housing.

In probe 70, there is a cup-shaped permanent magnet 73 that is mounted within housing 71 and extends inwardly of the housing from the open end 75. The permanent magnet 73 is molded or otherwise formed, preferably as a single piece, from a permanently magnetizable elastomer or resin material. The cylindrical portion of permanent magnet 73 is disposed in uniform surface-to-surface contact with the inner surface of the cylindrical portion of housing 71, and the base 74 of magnet 73 engages both collector 36 and housing base 72, again in surface-to-surface contact. Magnet 73 is magnetized in the directions indicated by the arrows in FIG. 7, presenting a uniform polarity throughout its interior surface and a uniform opposite polarity throughout its outer surface. Within magnet 73, the arrangement of core 36, pole piece 38, and coil 41, on its bobbin 42, remains the same as for the previously described embodiments.

Probe 70, FIG. 7, provides the same advantages as the previously described probes 30 and 60 of FIGS. 2 and 6, with additional advantages in some instances. Thus, the interior elements of the probe are completely shielded by the permanent magnet 73, which presents a permanently magnetized surface of the same polarity facing the entire collector, pole piece, and coil structure. The only magnet leakage occurs at the outer end 75 of housing 71, through a single high reluctance air gap around the end of magnet 73. Magnetic losses are extremely low. On the other hand, precision assembly is not required; the entire probe 71 can be rapidly assembled simply by inserting the components into the cup-shaped housing 71. As in the previous embodiments, the space around coil 41 and across the face of the probe may be filled with a suitable potting resin to afford a totally sealed construction.

I claim:

1. A magnetic probe for sensing the passage of a moving magnetic element, comprising:

a cylindrical housing of high permeability material;

a radially magnetized cylindrical permanent magnet mounted co-axially within the housing and extending inwardly from one end of the housing in circumferential surface-to-surface contact with the housing throughout the length of the magnet;

a core of high permeability material mounted within and extending axially of the permanent magnet, the core including a small diameter pole piece extending axially inwardly from the one end of the housing and joined to a large diameter magnetic flux collector engaging the interior of the permanent magnet in circumferential surface-to-surface contact at a location spaced from the one end of the housing;

and an electrical sensor coil encompassing the pole piece;

all flux paths between the inner surface of the permanent magnet and the housing at the opposite ends of the magnet being high-reluctance paths.

2. A magnetic probe according to claim 1 in which the housing is of uniform internal diameter and the permanent magnet comprises a thin, flat sheet of magnetizable elastomer material, having a length $L_m$ less than the length $L_h$ of the housing and having a width W no greater than the inner circumference of the housing, magnetized across its thickness, and curled lengthwise to fit into the housing.

3. A magnetic probe according to claim 2 in which the width W is slightly smaller than the inner housing circumference so that with the probe assembled there is a limited gap in the permanent magnet, affording a passageway for electrical conductors extending from the coil axially along the periphery of the collector to the opposite end of the housing.

4. A magnetic probe according to claim 1, in which the magnet core extends to the outer edge of the one end of the housing.

5. A magnetic probe according to claim 1 and further comprising:

a cylindrical internal shell of high permeability material extending from the collector toward the one end of the housing in surface contact with the interior of the permanent magnet.

6. A magnetic probe according to claim 1 in which the permanent magnet is of cup-shaped configuration, magnetized to afford inner and outer surfaces of uniform opposite polarities, with the base of the cup engaging the flux collector in surface-to-surface relation.

7. A magnetic probe according to claim 6 in which the housing is also of cup-shaped configuration, with the base of the housing engaging the base of the cup-shaped permanent magnet in surface-to-surface relation.

8. A magnetic probe for sensing the passage of a moving magnetic element, comprising:

a cylindrical housing of high permeability material;

a radially magnetized cylindrical permanent magnet, having a length $L_m$, mounted co-axially within the housing and extending inwardly from one end of the housing in circumferential surface-to-surface contact with the housing;

a core of high permeability material, having a length $L_c$, mounted within and extending axially of the permanent magnet, the core including a small diameter pole piece extending axially inwardly from the one end of the housing and joined to a large diameter magnetic flux collector engaging the interior of the permanent magnet in circumferential surface-to-surface contact at a location spaced from the one end of the housing;

and an electrical sensor coil encompassing the pole piece;

all flux paths between the inner surface of the permanent magnet and the housing at the opposite ends of the magnet being high-reluctance paths;

and $L_m$ being at least equal to $L_c$, with the permanent magnet positioned to encompass the full length of the core.

9. A magnetic probe according to claim 8 in which $L_m$ is greater than $L_c$ so that the permanent magnet projects beyond the core at the opposite end of the core from the pole piece.

10. A magnetic probe for sensing the passage of a moving magnetic element, comprising:

a cylindrical housing of high permeability material;

a radially magnetized cylindrical permanent magnet mounted co-axially within the housing and extending inwardly from one end of the housing in circumferential surface-to-surface contact with the housing;

a core of high permeability material mounted within and extending axially of the permanent magnet, the core including a small diameter pole piece extending axially inwardly from the one end of the housing and joined to a large diameter magnetic flux collector engaging the interior of the permanent magnet in circumferential surface-to-surface contact at a location spaced from the one end of the housing;

an auxiliary permanent magnet of disc-shaped configuration, magnetized in an axial direction, having one surface engaging the end of the collector opposite the pole piece;

an auxiliary flux collector connecting the opposite surface of the auxiliary magnet to the housing;

and an electrical sensor coil encompassing the pole piece;

all flux paths between the inner surfaces of the permanent magnets, on the one hand, and the housing and the auxiliary collector, on the other hand, at the opposite ends of the probe, being high-reluctance paths.

*11. A magnetic pick-up comprising:*

*an elongated ferromagnetic core which is substantially symmetrical about an axis;*

*a cylindrical permanent magnet sleeve of bonded permanent magnet material which fits closely around at least a portion of the magnetic core and is substantially co-terminous with one end of the core while not extending substantially beyond the other end of the core, the permanent magnet sleeve being magnetized in a direction radial to the axis of the core;*

*there being no low reluctance ferromagnetic path directly between the inner and outer surfaces of the permanent magnet sleeve;*

*and an electrical sensor coil encompassing a portion of the core.*

*12. A magnetic pick-up as defined in claim 11 in which the permanent magnet sleeve is substantially co-terminous with both ends of the ferromagnetic core.*

*13. A magnetic pick-up as defined in claim 11 encapsulated with resin which also encapsulates the leads adjacent the coil.*

*14. A magnetic pick-up as defined in claim 11 in which the coil does not extend radially outwardly beyond the face of the permanent magnet sleeve.*

*15. A magnetic pick-up as defined in claim 11 and further comprising a cylindrical housing of ferromagnetic material encompassing the permanent magnet sleeve in circumferential surface-to-surface contact therewith.*

* * * * *